United States Patent [19]

Bestler et al.

[11] Patent Number: 5,524,237

[45] Date of Patent: Jun. 4, 1996

[54] CONTROLLING DATA TRANSFER BETWEEN TWO MICROPROCESSORS BY RECEIVING INPUT SIGNALS TO CEASE ITS DATA OUTPUT AND DETECT INCOMING DATA FOR RECEPTION AND OUTPUTTING DATA THEREAFTER

[75] Inventors: Caitlin B. Bestler, Chicago; Mack S. Daily, Round Lake Park; Shu-Yuan V. Yang, Glenview, all of Ill.

[73] Assignee: Zenith Electronics Corporation, Glenview, Ill.

[21] Appl. No.: 987,223

[22] Filed: Dec. 8, 1992

[51] Int. Cl.⁶ ..................................... G06F 1/04
[52] U.S. Cl. ............. 395/550; 395/200.13; 364/229.1; 364/270.7; 364/940.2; 364/DIG. 1
[58] Field of Search .................... 395/200, 550, 395/725, 325; 364/229.1, 229.2, 229.4, 229.5, 230.5, 230.6, 270.7, 940.81, 945.9, 942.04, 942.05, 931.44, 931.48, 931.11, 940.81, 228, 228.3, 228.4, 228.5, 228.6, 931.4; 307/269

[56] References Cited

U.S. PATENT DOCUMENTS

| | | | |
|---|---|---|---|
| 4,121,285 | 10/1978 | Chen | 395/800 |
| 4,449,183 | 5/1984 | Flahive et al. | 395/478 |
| 4,694,472 | 9/1987 | Torok et al. | 375/354 |
| 4,730,268 | 3/1988 | Marin | 395/299 |
| 4,897,779 | 1/1990 | Dickson et al. | 395/200.14 |
| 4,972,313 | 11/1990 | Getson, Jr. et al. | 395/305 |
| 5,003,559 | 3/1991 | Kanai et al. | 375/358 |
| 5,022,050 | 6/1991 | Tanaka | 375/219 |
| 5,023,778 | 6/1991 | Simon, Jr. et al. | |
| 5,070,443 | 12/1991 | Priem et al. | 395/85 |
| 5,146,567 | 9/1992 | Kao | 395/892 |
| 5,155,807 | 10/1992 | Blevins et al. | 395/200.01 |
| 5,199,107 | 3/1993 | Ozawa | 395/550 |
| 5,303,345 | 4/1994 | Iguchi et al. | 395/200.14 |
| 5,361,376 | 11/1994 | Cummins et al. | 395/800 |
| 5,452,436 | 9/1995 | Arai et al. | 395/550 |

Primary Examiner—Thomas C. Lee
Assistant Examiner—Moustafa M. Meky

[57] ABSTRACT

A microprocessor communication system couples two microprocessors over a bus comprising a bidirectional data line, a bidirectional sync line and a pair of clock lines. A toggled clock signal serves as a control signal. Each microprocessor outputs data to the data and sync lines and monitors its incoming clock line. When a toggled clock signal is sensed, the receiving microprocessor, when its priorities permit, takes control of the bus and stops outputting data to the data and sync lines. It then detects the incoming data and when incoming data reception is completed, the microprocessor outputs new information to the data and sync lines and toggles its output clock line to signal to the other microprocessor that control of the bus has been relinquished. With the system, the microprocessors operate without the constraints of predetermined time intervals in which to output data or to receive data.

6 Claims, 2 Drawing Sheets

CONTROLLING DATA TRANSFER BETWEEN TWO MICROPROCESSORS BY RECEIVING INPUT SIGNALS TO CEASE ITS DATA OUTPUT AND DETECT INCOMING DATA FOR RECEPTION AND OUTPUTTING DATA THEREAFTER

BACKGROUND OF THE INVENTION AND PRIOR ART

This invention relates generally to microprocessor communication systems and specifically to a simple serial data transmission system for intercoupling a pair of microprocessors.

Conventionally, when a pair of microprocessors must communicate with each other, one microprocessor is placed in the position of a master and the other in the position of a slave so that control of the communication link or bus connecting the microprocessors may be transferred without confusion. While there are a number of systems for regulating the control of communications buses linking microprocessors, the present invention represents a very simple, economical approach.

The present invention will find use in many situations that require intercommunication between microprocessors. One particular implementation is that of a cable system in which the subscriber station cable converters are microprocessor controlled for receiving downloaded information from the cable head-end. The cable converter may also include an "add-on" on-screen display arrangement or unit for conveying selected information to a subscriber. For example, an out-of-band frequency shift keyed (FSK) type receiver in the add-on unit may receive downloaded channel mapping information in which the channel number displayed at the subscriber station may not be the channel number of the signal actually provided to the television receiver at the subscriber station. This is common in cable systems and is advantageous to the subscriber in that the channel number normally associated with a particular station is retained even though the cable system uses a different number for that station's television signal. In that arrangement, a so-called "conditional access" microprocessor in the subscriber station cable converter is in communication with a so-called "dialogue" microprocessor in the add-on unit and the communications between the two microprocessors must be regulated to enable the conditional access microprocessor to perform its various "off-line" functions while monitoring for downloaded information from the dialogue microprocessor. The dialogue microprocessor may also go "off-line" and perform other tasks for variable time periods, as required. The data protocol used may be conventional. For example, each microprocessor may send successive 24 bit data packets over a data line with data packets being separated by a sync bit, sent over a sync line, to inform the receiving microprocessor that the data packet is finished and to take appropriate action in response thereto.

OBJECTS OF THE INVENTION

A principal object of the invention is to provide an improved data communications system for a pair of interconnected microprocessors.

Another object of the invention is to provide a simplified intercommunication arrangement for microprocessors.

A further object of the invention is to provide a serial data intercommunication system between a pair of microprocessors which enables each microprocessor to perform tasks of higher priority without confusion.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
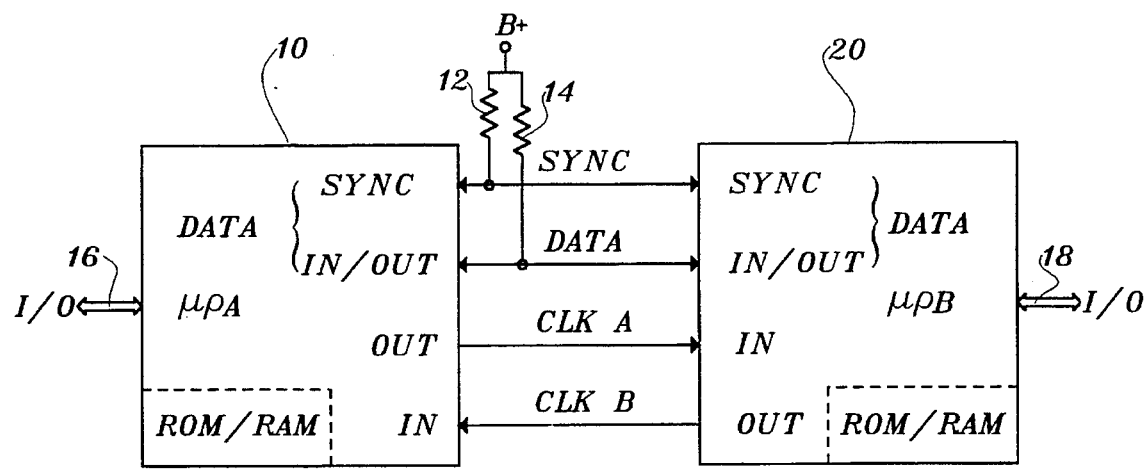
FIG. 1 is a simplified block diagram of a pair of microprocessors intercoupled in accordance with the invention.

Referring to FIG. 1, a first microprocessor A (reference 10) and a second microprocessor B (reference 20) are shown. The microprocessors are substantially identical, although that is not a requirement, and each includes a data in/out port, a sync in/out port, a clock in port and a clock out port. It will, of course, be noted that more than one bidirectional data port may be provided and such an arrangement is contemplated herein. The microprocessors also include conventional ROM and RAM memories and instruction programs (not shown) for effecting their respective operations. Microprocessor 10 is shown intercoupled along a bidirectional link or communication path 16 to an input/output device (not shown). Similarly, microprocessor 20 may be intercoupled to an input/output device (not shown) via a bidirectional link 18. The bidirectional nature of these links is indicated by the double headed arrows. The data in/out port and the sync in/out port of microprocessor 10 are connected by sync and data lines to the data in/out port and sync in/out port, respectively, of microprocessor 20. These lines may be individually connected to a source of B+ through pull-up resistors 12 and 14 as indicated. Also the clock out port of microprocessor 10 is coupled to the clock in port of microprocessor 20 and the clock in port of microprocessor 10 is connected to the clock out port of microprocessor 20. These latter lines are one way communication links, as illustrated by the single headed arrows. The arrangement of sync, data and clock lines comprises a bus that interconnects microprocessors 10 and 20.

Figure 2:
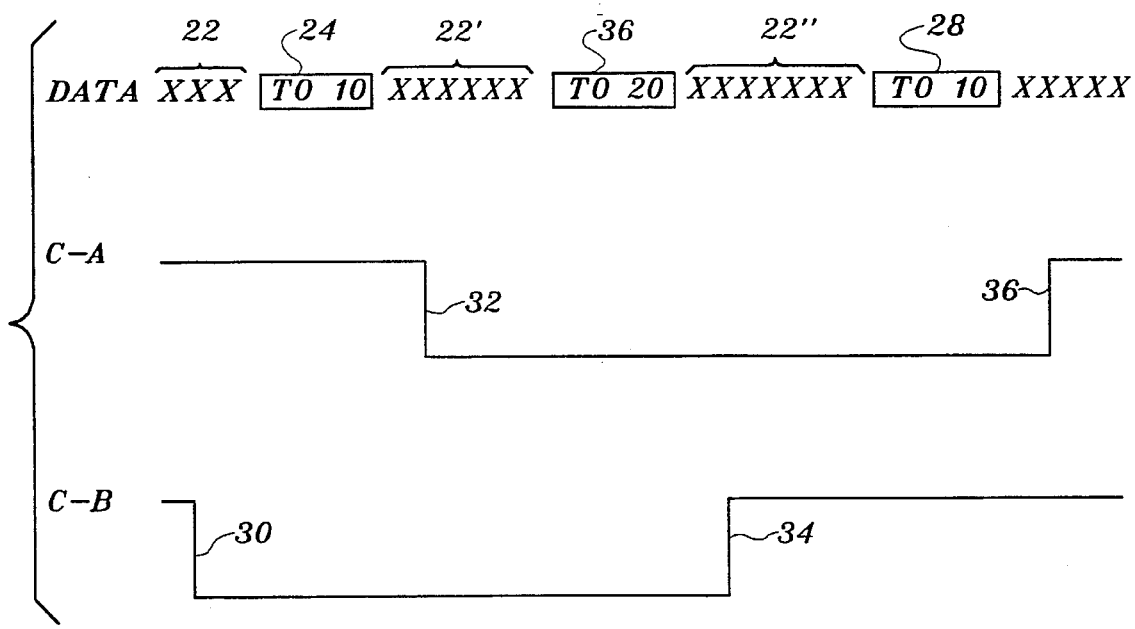
FIG. 2 is a series of waveforms indicating the exchange of data, sync and control signals between the microprocessors of FIG. 1.

In FIG. 2, data information 22 (indicated by the X's) is outputted simultaneously on the sync and data lines by both microprocessors 10 and 20. This data information consists of data pulses on the data line and sync pulses on the sync line (formatted according to an agreed upon protocol, such as that described above). The outputted data of both microprocessors 10 and 20 is combined on the data line since they simultaneously output information. (The sync line is also known as a data valid line and when the sync line is at zero, the information sent on the data line is immaterial. When no data of significance is being sent from one of the microprocessors, the sync transmission is in the form of zeros.) The data and sync transmission consists of pulling the respective line low for a "0" and releasing it (high) for a "1" bit. The clock lines of the microprocessors A and B are also illustrated. The clock lines are toggled (switched from high to low and vice versa) to indicate a change in control of the bus that interconnects the two microprocessors. The clock line input of each microprocessor is monitored for a change in level caused by the other microprocessor toggling the clock line. The toggling of the clock line by one of the microprocessors therefore functions as a control signal to indicate release of the bus to the other microprocessor.

Figure 3:
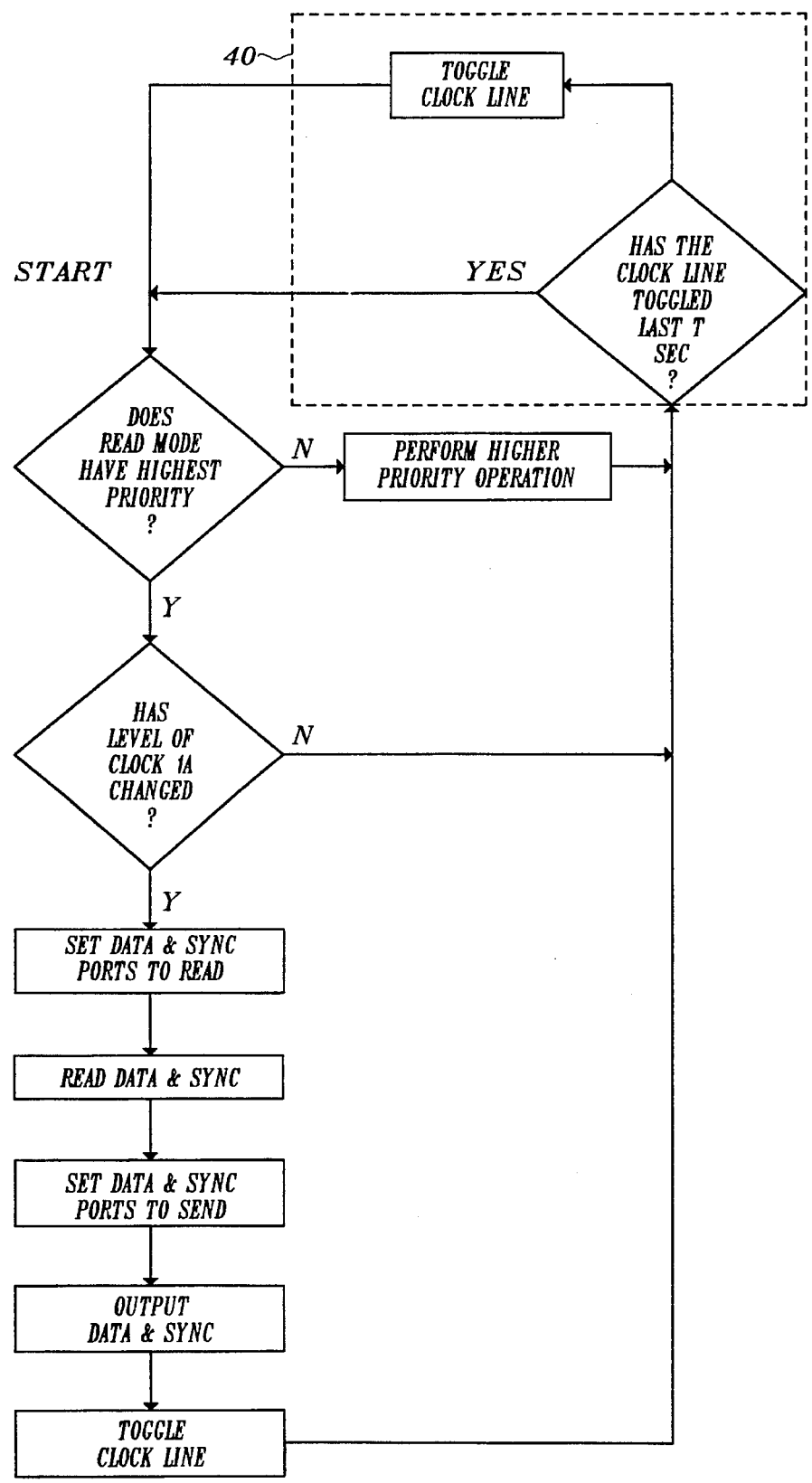
FIG. 3 is a simplified flow chart illustrating operation of the communication system of the invention.

In FIG. 3, the flow chart for both microprocessors is shown with the exception of the dashed line portion 40 which is included in only one of the microprocessors for reasons to be discussed. FIGS. 2 and 3 should be considered together in following the operation of the intercommunication system of the invention.

Assume a condition in which microprocessor 20 has toggled its clock output line CB, i.e. changed its voltage from high to low as indicated at 30. The toggled clock signal is a control signal that indicates that microprocessor 20 is outputting new information on the data and sync lines and has relinquished control of the bus. This toggling is noted by microprocessor 10 in due course. During this time, data and sync are outputted on these lines by both microprocessor 10 and microprocessor 20 as illustrated by the X's 22. Microprocessor 10, when its priorities permit, notes the toggled clock from microprocessor 20 at its (microprocessor 10's) clock input port and effectively takes control of the bus by terminating its own outputting of information to the data and sync lines and detecting the data and sync (from microprocessor 20) that are present at its data and sync ports. This is indicated by the block 24 labelled "To 10" where information on the lines is received by microprocessor 10. When reception of the data is complete, microprocessor 10 commences outputting its new data (and sync) as illustrated at 22' and then toggles its clock line CA (illustrated at 32) which in effect sends a control signal to the clock input port of microprocessor 20 telling microprocessor 20 that control of the bus has been relinquished. Microprocessor 20 in turn (when its priorities permit) monitors its clock input port and seizes control of the bus by terminating its outputting of information and receiving and detecting the data and sync that is present on the data and sync ports. This is illustrated by block 26 labelled "To 20". When reception of data is completed by microprocessor 20, it outputs new data (and sync) and toggles its clock output port (see 34) to indicate its relinquishing of control of the bus. Data and sync are therefore simultaneously being outputted by both microprocessors 10 and 20 for the period 22" and when microprocessor 10's priorities permit, it monitors its clock input port to determine whether a toggle has occurred. If so, it ceases outputting on the data and sync lines and detects the information that is at its data and sync ports. This is illustrated by the block 28 in which data is received by microprocessor 10. After the receipt of the data, microprocessor 10 toggles its clock output port (see 36) after commencing outputting of data and sync on the data and sync lines.

It is seen that both microprocessors output information simultaneously on the data and sync lines. As mentioned above, should there be no relevant information to output, the sync that is outputted takes the form of zeros or other suitable indicators of no meaningful information. In the dotted portion of the flow chart, there is a decision block that indicates that should no clock line toggling be noted for a given time period, that a forced toggle of the clock output port of one of the microprocessors is made. This prevents lock up during start up of the microprocessors where no seizure of control of the bus occurs.

What has been described is a novel, simple serial data communication system for coupling two microprocessors that need to "talk to" each other but that also must be free to perform other tasks. It is recognized that numerous changes in the described embodiment of the invention will be apparent to those skilled in the art without departing from its true spirit and scope. The invention is to be limited only as defined in the claims.

What is claimed is:

1. A system for effecting communications between first and second microprocessors, each including a clock input port, a clock output port and a data port comprising:

a first clock line connected between the clock input port of said first microprocessor and the clock output port of said second microprocessor for receiving a second toggled clock line control signal from said second microprocessor;

a second clock line connected between the clock output port of said first microprocessor and the clock input port of said second microprocessor for receiving a first toggled clock line control signal from said first microprocessor;

a bidirectional data link connected between the data ports of said microprocessor; and means in each of said first and second microprocessors for outputting data simultaneously to said bidirectional data link and including a stored program for generating said first and said second toggled clock line control signals, respectively, at its clock output port for relinquishing control of said data link and, in response to detection of said second and said first toggled clock line control signals, respectively, at its clock input port, for assuming control of said data link and for ceasing its outputting of data to said bidirectional data link and detecting incoming data on its data port for reception, and after reception, outputting outgoing data from the data port to the data link, and thereafter, generating a toggled clock line control signal at its clock output port.

2. The system of claim 1 further including a second data port on each of said microprocessors and a second bidirectional data link coupling said second data ports for providing sync signals thereover.

3. A system for effecting communications between first and second microprocessors, each including a bidirectional data port and an input and an output clock port comprising:

a first clock line connected between the input clock port of said first microprocessor and the output clock port of said second microprocessor for receiving a second toggled clock line control signal from said second microprocessor;

a second clock line connected between the output clock port of said first microprocessor and the input clock port of said second microprocessor for receiving a first toggled clock line control signal from said first microprocessor;

a bidirectional data link connected between said bidirectional data ports of said first and said second microprocessors, both said microprocessors simultaneously outputting data to said bidirectional data link; and a stored control program in each of said first and said second microprocessors for generating said first and said second control signals, respectively, at its output clock port by toggling its respective clock line for relinquishing control of said bidirectional data link and for detecting a toggled clock line representing said second and said first control signals, respectively, at its input clock port for assuming control of said bidirectional data link and for terminating its outputting of data on said bidirectional data link and detecting incoming data on its data port for reception, and after reception, outputting outgoing data from the data port to the data link, and thereafter, generating a toggled clock line control signal at its clock output port.

4. The system of claim 3, further including a bidirectional sync port on each of said microprocessors and a second bidirectional link interconnecting said bidirectional sync ports and wherein control of said bidirectional data link and said second bidirectional link is accomplished simultaneously.

5. The method of effecting communications between a pair of microprocessors comprising:

simultaneously outputting data from both microprocessors via data ports to a bidirectional data link;

monitoring the clock input port of each microprocessor for a toggled clock line control signal from the clock output port of the other microprocessor;

detecting incoming data at the data port of each said microprocessor for reception after detection of a toggled clock line control signal, from the clock output port of the other microprocessor, at its clock input port after terminating its outputting of data to the bidirectional data link; and after reception, outputting outgoing data from the data port of each microprocessor to the bidirectional data link after detection of incoming data and thereafter generating a toggled clock line control signal, to the clock input port of the other microprocessor, at its clock output port.

6. The method of claim 5 wherein one of said microprocessors monitors the detection of the last toggled clock line control signal from said other microprocessor and forces a toggled clock line control signal when the time elapsed since the last toggled line control signal exceeds a predetermined maximum.

* * * * *